US012746825B2

(12) United States Patent
Liu et al.

(10) Patent No.: US 12,746,825 B2
(45) Date of Patent: Sep. 29, 2026

(54) METHOD AND SYSTEM FOR ESTIMATING FLIGHT TIME OF A HYDROGEN FUEL CELL UAV

(71) Applicant: INDUSTRIAL TECHNOLOGY RESEARCH INSTITUTE, Hsinchu (TW)

(72) Inventors: Ching-Jung Liu, Hsinchu County (TW); Yuh-Fwu Chou, Zhubei City (TW); Ku-Yen Kang, Zhubei City (TW); Yin-Wen Tsai, Zhubei City (TW); Ching-Fang Ho, Taichung City (TW); Cheng-Hsien Yu, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 670 days.

(21) Appl. No.: 18/199,353

(22) Filed: May 18, 2023

(65) Prior Publication Data

US 2024/0157801 A1 May 16, 2024

Related U.S. Application Data

(60) Provisional application No. 63/425,192, filed on Nov. 14, 2022.

(30) Foreign Application Priority Data

Nov. 30, 2022 (TW) ................................. 111145957

(51) Int. Cl.
*B60L 3/12* (2006.01)
*B60L 50/70* (2019.01)
(Continued)

(52) U.S. Cl.
CPC ................ *B60L 3/12* (2013.01); *B60L 50/70* (2019.02); *B64U 50/32* (2023.01);
(Continued)

(58) Field of Classification Search
CPC ........ B60L 3/12; B60L 50/70; B60L 2200/10; B64U 50/32; H01M 8/04201;
(Continued)

(56) References Cited

U.S. PATENT DOCUMENTS

| | | | |
|---|---|---|---|
| 11,258,081 | B2 | 2/2022 | Min et al. |
| 2015/0044582 | A1 | 2/2015 | Chikugo et al. |

(Continued)

FOREIGN PATENT DOCUMENTS

| | | | |
|---|---|---|---|
| CN | 104160542 | A | 11/2014 |
| CN | 106295195 | A | 1/2017 |

(Continued)

OTHER PUBLICATIONS

Taiwan Office Action issued in corresponding application No. 111145957, dated Jul. 10, 2023.

(Continued)

*Primary Examiner* — James M Erwin
(74) *Attorney, Agent, or Firm* — Maschoff Brennan

(57) ABSTRACT

A method for estimating a flight time of a hydrogen fuel cell UAV (unmanned aerial vehicle) includes multiple steps performed by a controller: obtaining an internal pressure of a hydrogen tank by a pressure sensor installed on the hydrogen tank, calculating a remaining hydrogen volume according to the internal pressure and a capacity of the hydrogen tank, obtaining a reaction current value of the fuel cell, calculating a first hydrogen consumption rate according to the reaction current value, the number of a set of membrane electrodes connected in series and a Faraday constant, obtaining a second hydrogen consumption rate of a purge (Continued)

operation of an anode of the full cell; obtaining a hydrogen leakage rate of a stack of the fuel cell, and calculating the flight time according to the remaining hydrogen volume, the first hydrogen consumption rate, the second hydrogen consumption rate and the hydrogen leakage rate.

6 Claims, 6 Drawing Sheets

(51) Int. Cl.
*B64U 50/32* (2023.01)
*H01M 8/04082* (2016.01)
*H01M 8/04223* (2016.01)
*H01M 8/0438* (2016.01)
*H01M 8/04746* (2016.01)

(52) U.S. Cl.
CPC ... *H01M 8/04201* (2013.01); *H01M 8/04231* (2013.01); *H01M 8/04388* (2013.01); *H01M 8/04753* (2013.01); *B60L 2200/10* (2013.01); *H01M 2250/20* (2013.01)

(58) Field of Classification Search
CPC ......... H01M 8/04231; H01M 8/04388; H01M 8/04753; H01M 2250/20
USPC .......................................................... 429/445
See application file for complete search history.

(56) References Cited

U.S. PATENT DOCUMENTS

| | | | |
|---|---|---|---|
| 2018/0275202 A1 | 9/2018 | Zhan et al. | |
| 2020/0119378 A1 | 4/2020 | Min et al. | |
| 2021/0190878 A1 | 6/2021 | Lee et al. | |
| 2022/0402621 A1 * | 12/2022 | McLean | B64D 27/355 |
| 2023/0147606 A1 | 5/2023 | Nakayama | |

FOREIGN PATENT DOCUMENTS

| | | | | | |
|---|---|---|---|---|---|
| CN | 106324511 A | | 1/2017 | |
| CN | 107329095 A | | 11/2017 | |
| CN | 110137531 A | | 8/2019 | |
| CN | 110336058 A | | 10/2019 | |
| CN | 110549915 A | | 12/2019 | |
| CN | 111344584 A | | 6/2020 | |
| CN | 114212004 A | | 3/2022 | |
| CN | 114744256 A | | 7/2022 | |
| CN | 114906014 A | * | 8/2022 | B60L 58/12 |
| CN | 115315632 A | | 11/2022 | |
| DE | 102016011140 A1 | * | 3/2018 | G08B 21/12 |
| KR | 20210125123 A | * | 10/2021 | B64D 37/005 |
| TW | 202229917 A | | 8/2022 | |
| WO | 2017/092005 A1 | | 6/2017 | |
| WO | 2022/011479 A1 | | 1/2022 | |
| WO | 2022/076450 A1 | | 4/2022 | |

OTHER PUBLICATIONS

Li Kun, "What is Purge? How does Hyundai Nexo estimate the hydrogen concentration and formulate the Purge strategy?," Fuel Cell Encyclopedia published Jul. 13, 2020.

* cited by examiner

METHOD AND SYSTEM FOR ESTIMATING FLIGHT TIME OF A HYDROGEN FUEL CELL UAV

CROSS-REFERENCE TO RELATED APPLICATIONS

This non-provisional application claims priority under 35 U.S.C. § 119(a) on Patent Application No(s). 63/425,192 filed in U.S.A. on Nov. 14, 2022, the entire contents of which are hereby incorporated by reference.

BACKGROUND

1. Technical Field

The present disclosure relates to a hydrogen fuel cell and an unmanned aerial vehicle (UAV), and more particularly to a method and a system for estimating flight time of the hydrogen fuel cell UAV.

2. Related Art

Hydrogen fuel cells can be used on various vehicles. For example, cars, ships, bicycles or even UAVs can be equipped with fuel cell as a power source. With the increasing awareness of environmental protection, the reactant discharged from the fuel cell is only pure water, which will not cause pollution. Compared with using lithium batteries as a power source, fuel cells with the same weight have higher energy density and can meet longer mission requirements. In practical applications, accurate battery life estimation is an important factor in completing tasks.

Most of the flight time calculations of existing hydrogen fuel cell UAVs are obtained by estimating the volume of hydrogen stored in the high-pressure hydrogen tank and the power generated by the fuel cell. However, in addition to the hydrogen consumed for power generation, there is also a part of the hydrogen discharged without reaction, including the purge operation during the operation of the fuel cell and the leakage of the stack. When the UAV performs missions in the air, it is necessary to reserve time for returning or landing to avoid the inability of the flight due to insufficient hydrogen remaining. Therefore, it is necessary to handle the consumption of hydrogen and estimate the most accurate flight time to ensure the safety of the flight process.

The current approach of estimating the flight time of the hydrogen fuel cell UAV usually considers UAV weight, flight speed, wind conditions, pressure and capacity of hydrogen tank and other conditions, and then evaluates flight time based on past experience. However, this approach does not consider the hydrogen consumption discharged without reaction, and only focuses on the hydrogen consumption of power-generating reaction. Therefore, the current approach cannot accurately estimate flight time. It is often necessary to prepare more spare fuel to reduce flight risk.

SUMMARY

According to an embodiment of the present disclosure, a method for estimating a flight time of a hydrogen fuel cell unmanned aerial vehicle (UAV) includes a plurality of steps performed by a controller. The plurality of steps includes: obtaining an internal pressure of a hydrogen tank by a pressure sensor installed on the hydrogen tank; calculating a remaining hydrogen volume according to the internal pressure and a capacity of the hydrogen tank; obtaining a reaction current value of a fuel cell; calculating a first hydrogen consumption rate according to the reaction current value, the number of a set of membrane electrodes connected in series and a Faraday constant; obtaining a second hydrogen consumption rate of a purge operation of an anode of the full cell; obtaining a hydrogen leakage rate of a stack of the fuel cell; and calculating the flight time according to the remaining hydrogen volume, the first hydrogen consumption rate, the second hydrogen consumption rate and the hydrogen leakage rate.

According to an embodiment of the present disclosure, a hydrogen fuel cell system for flight time estimation includes a hydrogen tank, a pressure sensor, a fuel cell stack, a control circuit, and a controller. The hydrogen tank is configured to store hydrogen. The pressure sensor is disposed in the hydrogen tank and configured to obtain an internal pressure of the hydrogen tank. The fuel cell stack is coupled to the hydrogen tank for obtaining the hydrogen to perform a power-generating reaction. The fuel cell stack has an anode to perform a purge operation. The control circuit is electrically connected to the fuel cell stack and configured to obtain a reaction current value of the power-generating reaction. The controller is electrically connected to the pressure sensor and the control circuit. The controller is configured to: calculating a remaining hydrogen volume according to the internal pressure and a capacity of the hydrogen tank; calculating a first hydrogen consumption rate according to the reaction current value, the number of a set of membrane electrodes connected in series and a Faraday constant; and calculating the flight time according to the remaining hydrogen volume, the first hydrogen consumption rate, the second hydrogen consumption rate associated with the purge operation and the hydrogen leakage rate of the fuel cell stack.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
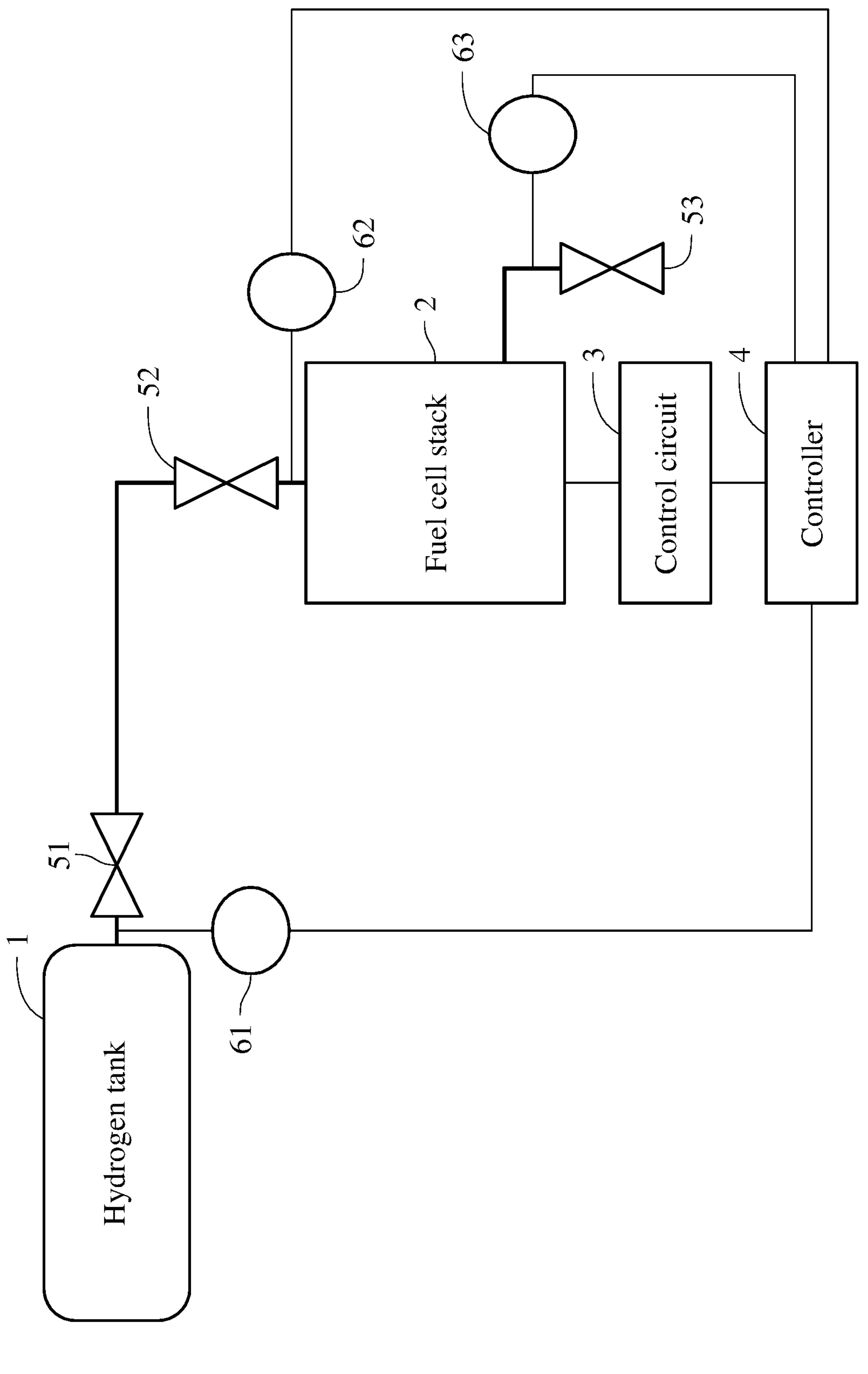
FIG. 1 is an architectural diagram of a hydrogen fuel cell system for flight time estimation according to an embodiment of the present disclosure.

Please refer to FIG. 1. FIG. 1 is an architectural diagram of a hydrogen fuel cell system for flight time estimation according to an embodiment of the present disclosure. As shown in FIG. 1, the fuel cell system for flight time estimation includes a hydrogen tank 1, a fuel cell stack 2, a control circuit 3, a controller 4, a plurality of valves 51, 52, 53 and a plurality of pressure sensors 61, 62, 63. The flight time refers to the time length that remaining fuel is available for flight.

The hydrogen tank 1 is configured to store hydrogen. The hydrogen tank 1 is coupled to the fuel cell stack 2 through a pipeline to provide the hydrogen. The pipeline includes the valve 51 and the valve 52, wherein the valve 51 and the valve 52 are connected to the pressure sensor 61 and the pressure sensor 62 respectively. The pressure sensor 61 is configured to obtain an internal pressure of the hydrogen tank 1, and the pressure sensor 62 is configured to obtain the pressure of the valve 52 at the hydrogen inlet of the fuel cell stack 2.

Figure 2:
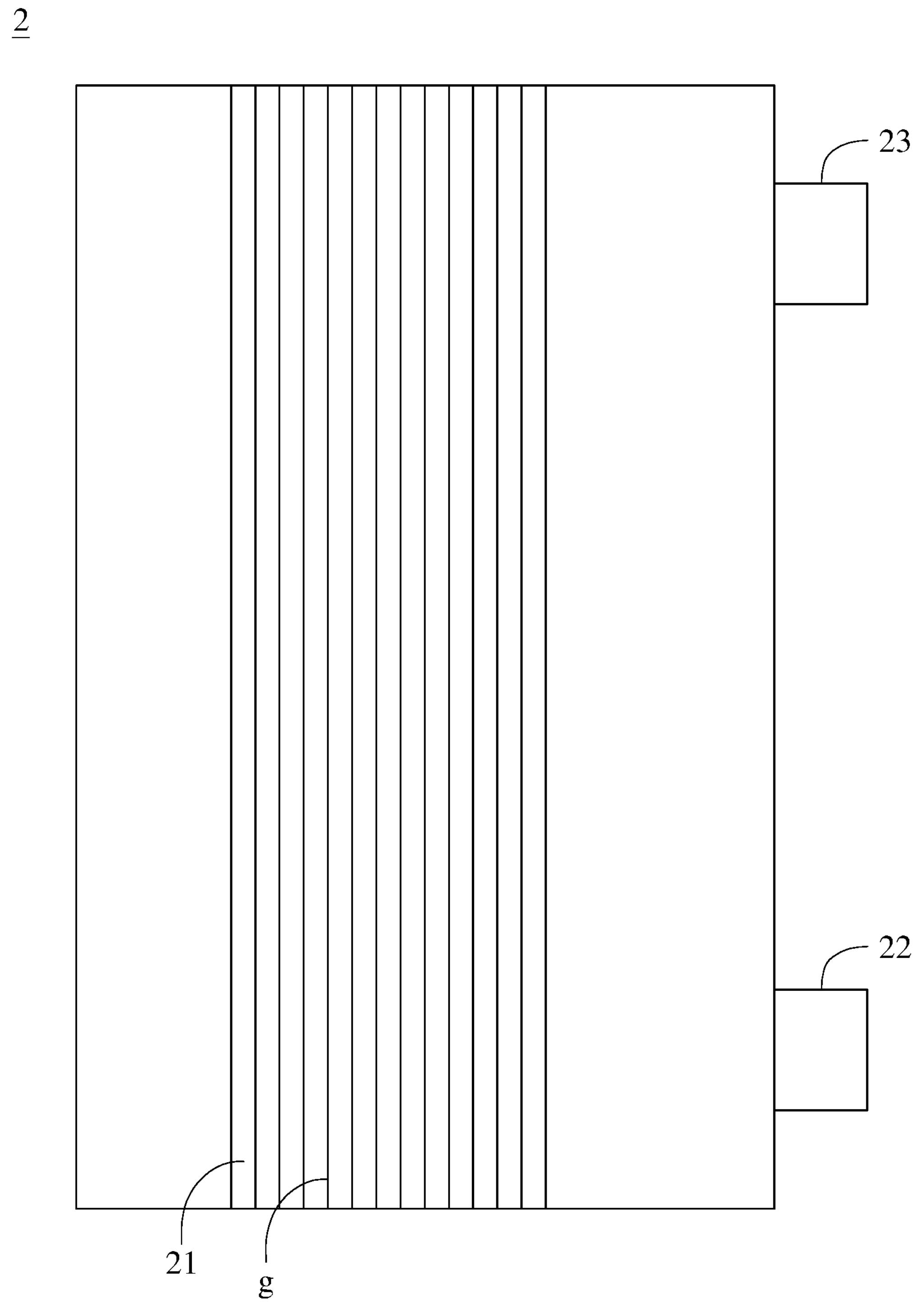
FIG. 2 is a schematic diagram of the fuel cell stack according to an embodiment of the present disclosure.

The fuel cell stack 2 is coupled to the hydrogen tank 1 through the pipeline and the valve 52 at the end to obtain the hydrogen to perform a power-generating reaction. Please refer to FIG. 2. FIG. 2 is a schematic diagram of the fuel cell stack 2 according to an embodiment of the present disclosure. The fuel cell stack 2 includes an anode air inlet 22, an anode air outlet 23 and a plurality of membrane electrode assemblies (MEA) forming a stack. The MEA and the flow field plate are marked as 21 in FIG. 2. In practice, gas leakage may occur at the contact surface between the adjacent MEA and the flow field plate or at the breakage of the separation film of the MEA cathode and anode.

The anode fuel outlet 22 of the fuel cell stack 2 may perform a purge operation through the exhaust valve 53. For example, when the hydrogen fuel cell stack 2 is operating, it takes 5 to 60 seconds to perform an anode purge operation, and each time takes about 0.1 to 0.2 seconds to push out the accumulated water of the anode. Since the purge operation pushes out the accumulated water of the anode by air pressure difference, the number of executions is quite frequent. Therefore, when evaluating the UAV flight time, in addition to the reaction consumption of fuel cell stack 2, it is more necessary to include the volume of anode hydrogen purge into the calculation. In an embodiment, the hydrogen discharge rate may be estimated by the number of purge operations.

As shown in FIG. 1, the control circuit 3 is electrically connected to the fuel cell stack 2 to obtain a reaction current value of the power-generating reaction. The controller 4 is electrically connected to all of the pressure sensors 61, 62, 63 and the control circuit 3. The controller 4 is configured to calculate a remaining hydrogen volume according to an internal pressure of the hydrogen tank 1 sensed by the pressure sensor 61 and a capacity of the hydrogen tank 1 pre-stored in the controller 4, calculate a first hydrogen consumption rate according to the reaction current value, the number of a set of membrane electrodes connected in series and a Faraday constant, calculate a flight time according to the remaining hydrogen volume, the first hydrogen consumption rate, the second hydrogen consumption rate associated with the purge operation and the hydrogen leakage rate of the fuel cell stack 2. The following uses the method for estimating the flight time of a hydrogen fuel cell UAV of an embodiment of the present disclosure to describe the calculation method of the controller 4. In an embodiment, one of the pressure sensors 62 and 63 may be selected for installation.

Figure 3:
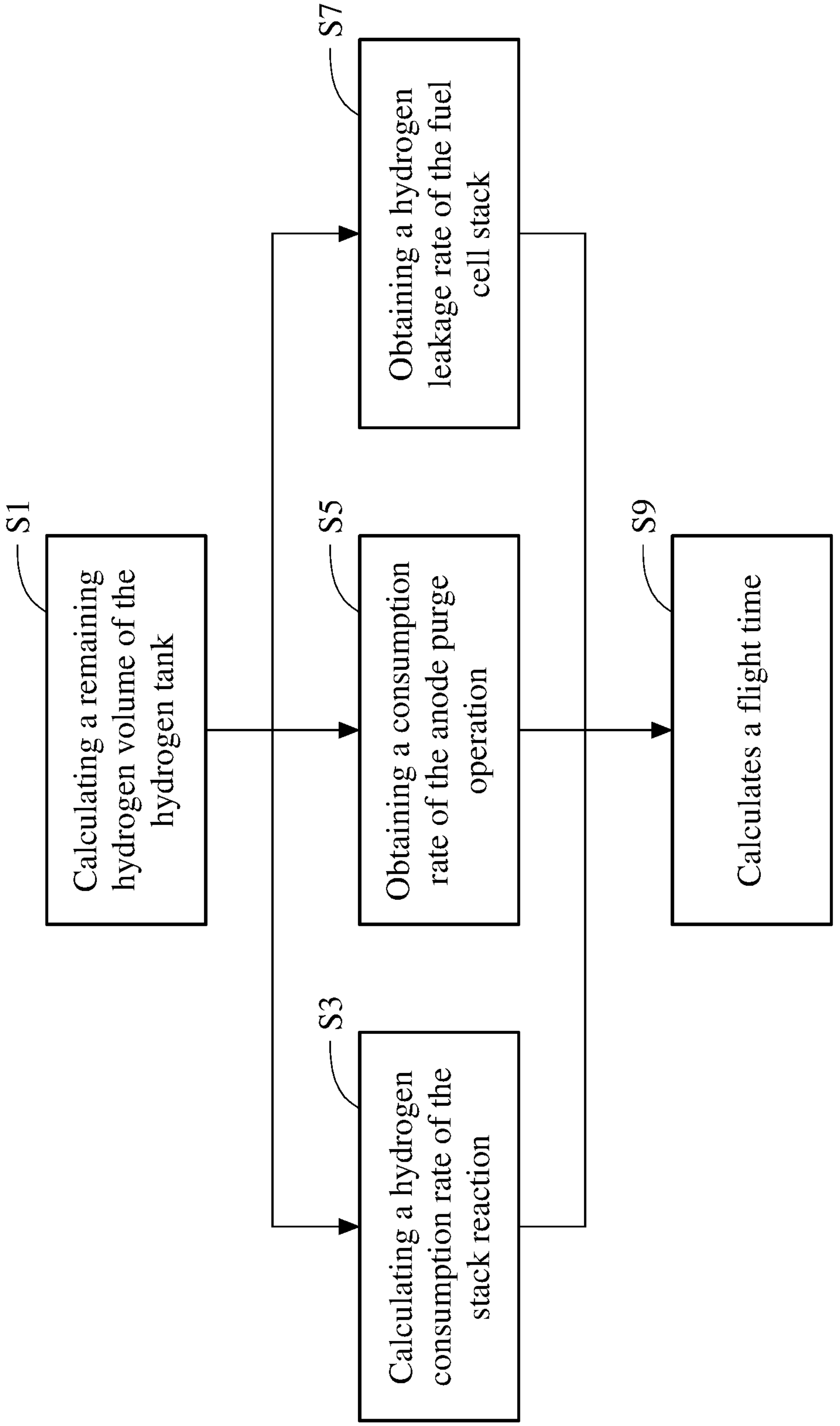
FIG. 3 is a flowchart of a method for estimating a flight time of a hydrogen fuel cell UAV according to an embodiment of the present disclosure.

Please refer to FIG. 3. FIG. 3 is a flowchart of a method for estimating a flight time of a hydrogen fuel cell UAV according to an embodiment of the present disclosure, and includes steps S1, S3, S5, S7, and S9.

Figure 4:
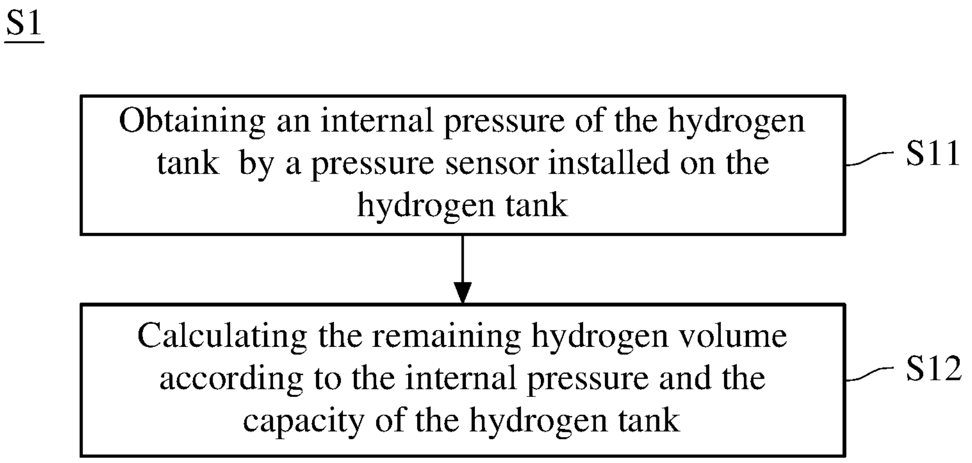
FIG. 4 is a detailed flowchart of an embodiment of a step in FIG. 3.

In step S1, the controller 4 calculates a remaining hydrogen volume of the hydrogen tank 1. Please refer to FIG. 4. FIG. 4 is a detailed flowchart of an embodiment of step S1 in FIG. 3, and includes steps S11 and S12. In step S11, the controller 4 obtains an internal pressure of the hydrogen tank 1 by a pressure sensor 61 installed on the hydrogen tank 1. In step S12, the controller 4 may calculate the remaining hydrogen volume according to the internal pressure, the capacity of the hydrogen tank 1, ideal gas equation and gas compressibility, where the capacity of the hydrogen tank 1, ideal gas equation and gas compressibility may pre-stored in the controller 4.

Figure 5:
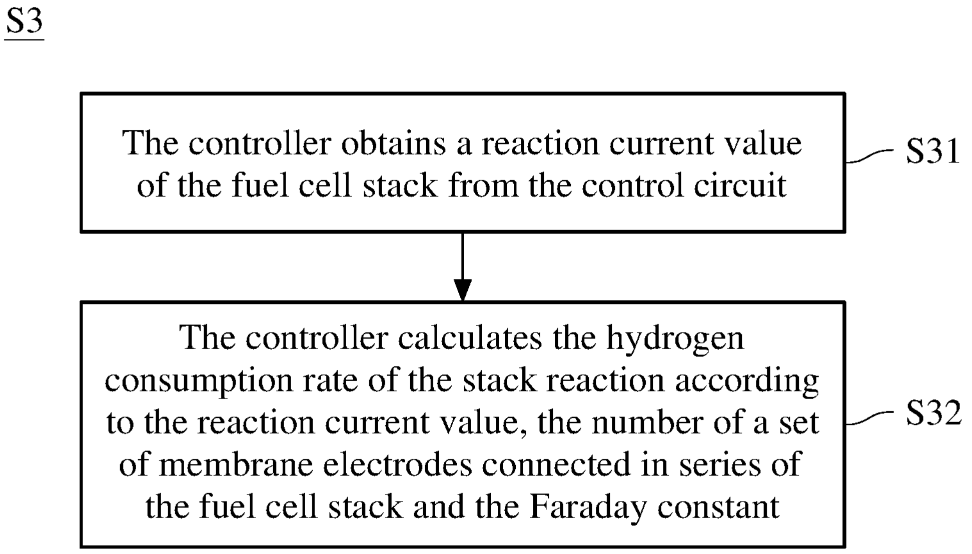
FIG. 5 is a detailed flowchart of an embodiment of a step in FIG. 3.

In step S3, the controller 4 calculates a hydrogen consumption rate of the stack reaction, which is the part of fuel cell stack 2 that mainly consumes hydrogen. Please refer to FIG. 5. FIG. 5 is a detailed flowchart of an embodiment of step S3 in FIG. 3, and includes step S31 and step S32. In step S31, the controller 4 obtains a reaction current value of the fuel cell stack 2 from the control circuit 3. In step S32, the controller 4 calculates the hydrogen consumption rate of the stack reaction according to the reaction current value, the number of a set of membrane electrodes connected in series of the fuel cell stack 2 and the Faraday constant. In an embodiment, the controller 4 implement step S32 with equation 1 below.

$$H_i=(S\times I)/(2\times F) \quad \text{(Equation 1)},$$

where $H_i$ denotes the hydrogen consumption rate of the stack reaction, whose unit is "liter per minute", S denotes the number of a set of membrane electrodes connected in series, I denotes the reaction current value, and F denotes Faraday constant, 96485 C/mol.

In step S5, the controller 4 obtains a consumption rate of the anode purge operation. In an embodiment, this consumption rate can be measured through experiments before the UAV takes off. For example, one may set an airtight chamber connected to the inlet and outlet valves that is consistent with the intake flow pressure conditions of the stack operation, set the same exhaust frequency, and perform cumulative exhaust 50-100 times. After that, one may calculate the weight difference or air pressure difference, and then convert the average exhaust gas volume for each execution of exhaust.

Figure 6:
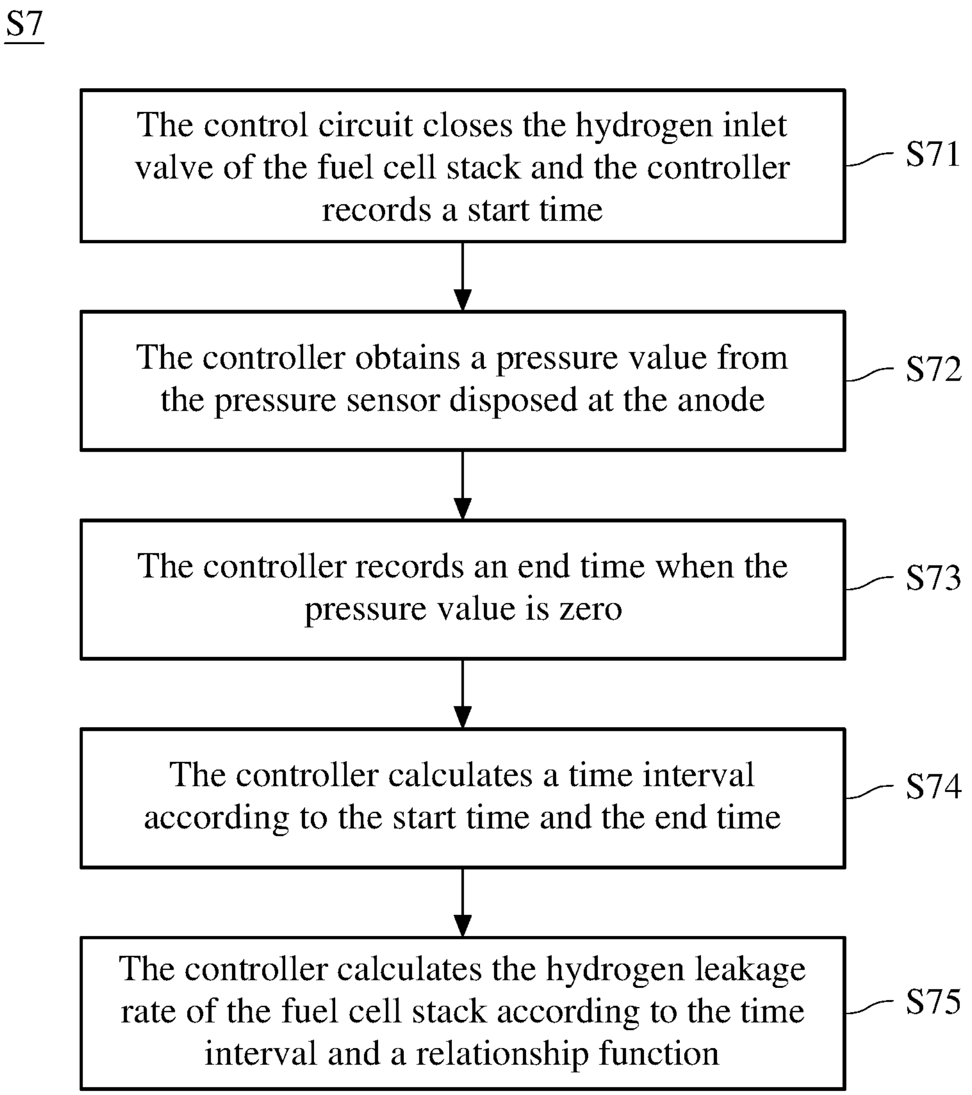
FIG. 6 is a detailed flowchart of an embodiment of a step in FIG. 3.

In step S7, the controller 4 obtains a hydrogen leakage rate of the fuel cell stack 2. Step S7 may be performed when the fuel cell stack 2 is not used for power generation whether it is before UAV flight or during flight. Please refer to FIG. 6. FIG. 6 is a detailed flowchart of an embodiment of step S7 in FIG. 3, and includes steps S71 to S75.

In step S71, the control circuit 3 closes the hydrogen inlet valve 52 of the fuel cell stack 2. When the hydrogen inlet valve 52 is closed, the controller 4 records a start time. In an embodiment, the premise of the execution of step S74 is that the hydrogen gas entering stack 2 has reached the working pressure, and the anode fuel outlet valve 23 is closed.

In step S72, the controller 4 periodically obtains pressure values from pressure sensor 62 or 63 disposed at the anode fuel outlet or inlet. In step S73, when the pressure value obtained by the controller 4 is zero, the controller 4 records an end time. In step S74, the controller 4 calculates a time interval according to the start time and the end time.

Figure 7:
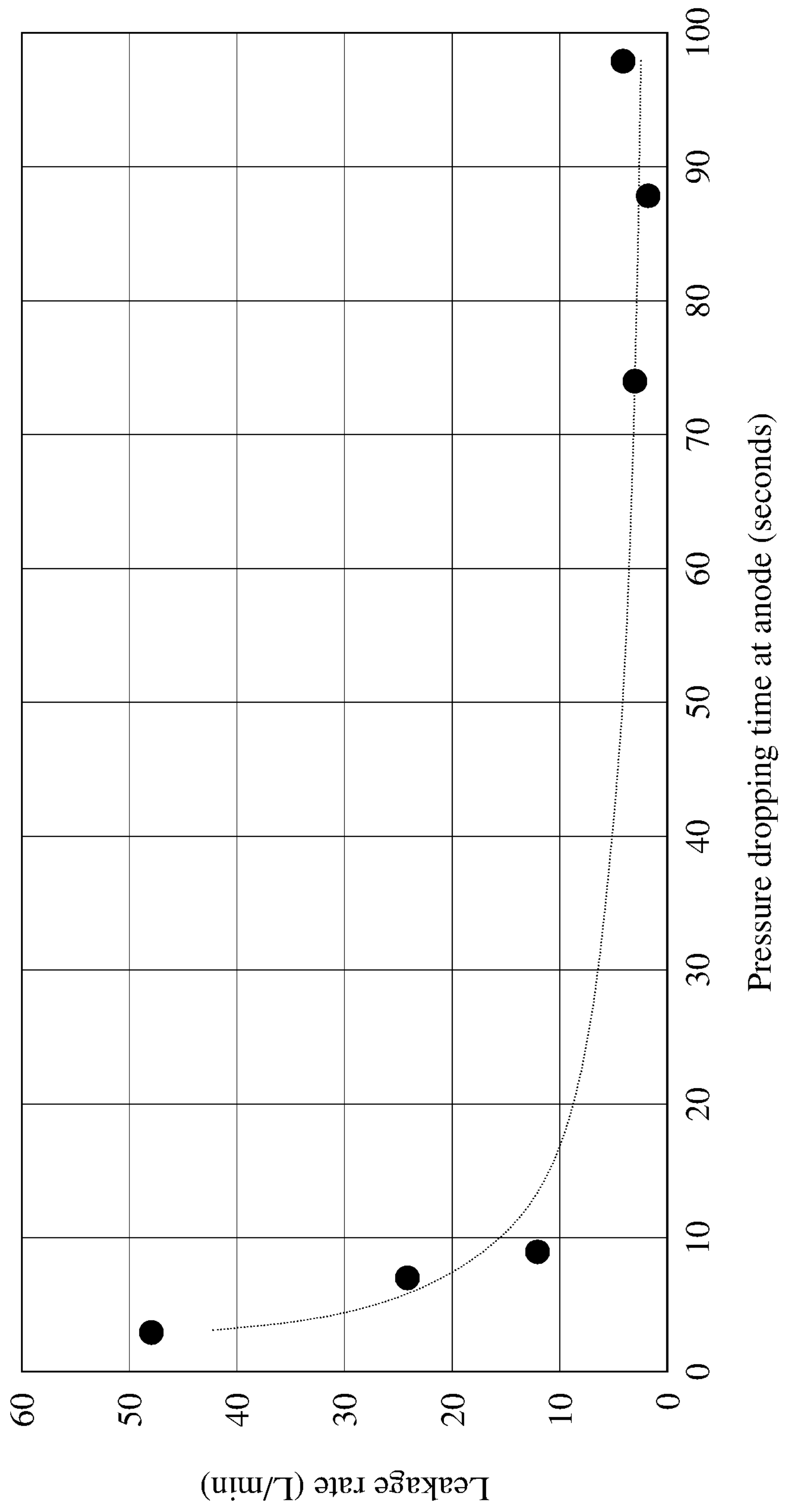
FIG. 7 is a schematic diagram of an embodiment of the stack leakage relationship function.

In step S75, the controller 4 calculates the hydrogen leakage rate of the fuel cell stack 2 according to the time interval and a relationship function. Please refer to FIG. 7. FIG. 7 is a schematic diagram of an embodiment of the stack leakage relationship function. As shown in FIG. 7, the value of time interval calculated by the controller 4 in step S74 may correspond to the horizontal axis in FIG. 7, and thus the hydrogen leakage rate may be obtained according to the vertical axis of FIG. 7. In an embodiment, the curve of the relationship function shown in FIG. 7 may be summarized through multiple experiments. For example, the experiment includes: connecting the hydrogen tank 1 to the fuel cell stack 2, closing the outlet valve 23, opening the inlet valve 22, waiting for a period of time (such as 3-10 minutes), and then measuring weight difference or air pressure difference of the hydrogen tank 1 to converting the gas leakage rate of fuel cell stack 2. By accumulating data of different gas leakage rates of the fuel cell stack 2 and the time interval values obtained by step S74, the curve of FIG. 7 may be generated.

Please refer to FIG. 3. In step S9, the controller 4 calculates the flight time according to the remaining hydrogen volume, the hydrogen consumption rate of the fuel cell stack 2, the hydrogen consumption rate of the anode purge operation and the hydrogen leakage rate. In an embodiment, the controller 4 implements step S9 by Equation 2 below.

$$t=H_{tank}/(H_i+c_1\times H_P+c_2\times H_L) \quad \text{(Equation 2)},$$

where t denotes the flight time, $H_{tank}$ denotes the remaining volume of hydrogen in the hydrogen tank 1, $H_i$ denotes the stack hydrogen consumption rate, $H_P$ denotes the hydrogen consumption rate of the anode purge operation, $H_L$ denotes the hydrogen leakage rate, and $c_1$ and $c_2$ denote correction constants, which may be adjusted according to stack temperature, ambient temperature or anode hydrogen pressure and other conditions.

Table 1 below includes the symbols mentioned in Equation 1 and Equation 2, with their meanings and units.

TABLE 1 symbol list.

| Symbol | Meaning | Unit |
|---|---|---|
| t | The flight time | Minute |
| $H_{tank}$ | The remaining volume of hydrogen in the hydrogen tank | Liter |
| $H_i$ | The hydrogen consumption rate of stack reaction | Liter/Minute |
| S | The number of a set of membrane electrodes connected in series | Piece |
| I | The reaction current value | Ampere |
| F | Faraday constant | Columb/Mole |
| $H_P$ | The hydrogen consumption rate of purge operation | Liter/Minute |
| $H_L$ | The stack hydrogen leakage rate | Liter/Minute |

To sum up, the hydrogen fuel cell system for flight time estimation and method for estimating the flight time of the hydrogen fuel cell UAV proposed by the present disclosure may be used for hydrogen fuel cell UAV long-range flight mission planning and real-time monitoring during mission flight. The present disclosure subdivides the hydrogen consumption into reaction consumption and non-reaction consumption, and considers fuel cell reaction consumption, anode hydrogen purge volume and stack gas leakage together to distinguish the hydrogen consumption status of individual stacks. The present disclosure allows users to more accurately estimate UAV flight time by accurately calculating hydrogen consumption. In practical applications, the difference between the flight time calculated by the present disclosure and the flight time calculated by the traditional method (only estimating the hydrogen consumed by the stack reaction) can reach 32.6%. This is because when the volume of hydrogen consumed by non-reaction increases, the error of the estimated flight time will also increase. Therefore, during UAV flight, it is the most accurate to estimate the remaining flight time by the volume of hydrogen consumed by the reaction and non-reaction consumption of the fuel cell system, and that is the method adopted in the present disclosure.

What is claimed is:

1. A method for estimating a flight time of a hydrogen fuel cell unmanned aerial vehicle (UAV), comprising a plurality of steps performed by a controller, wherein the plurality of steps comprises:

- obtaining an internal pressure of a hydrogen tank by a pressure sensor installed on the hydrogen tank;
- calculating a remaining hydrogen volume according to the internal pressure and a capacity of the hydrogen tank;
- obtaining a reaction current value of a fuel cell;
- calculating a first hydrogen consumption rate according to the reaction current value, a number of a set of membrane electrodes connected in series and a Faraday constant;
- obtaining a second hydrogen consumption rate of a purge operation of an anode of the full cell;
- obtaining a hydrogen leakage rate of a stack of the fuel cell; and
- calculating the flight time according to the remaining hydrogen volume, the first hydrogen consumption rate, the second hydrogen consumption rate and the hydrogen leakage rate.

2. The method for estimating the flight time of the hydrogen fuel cell UAV of claim 1 further comprising:

- closing a hydrogen inlet valve of the stack by a control circuit, wherein obtaining the hydrogen leakage rate of the stack of the fuel cell comprises:
- recording a start time by the controller when the hydrogen inlet valve is closed;
- obtaining a pressure value from another pressure sensor disposed on the anode periodically by the controller;
- recording an end time by the controller when the pressure value is zero;
- calculating a time interval according to the start time and the end time by the controller; and
- calculating the hydrogen leakage rate of the stack according to the time interval and a relationship function by the controller.

3. The method for estimating the flight time of the hydrogen fuel cell UAV of claim 1, wherein calculating the flight time according to the remaining hydrogen volume, the first hydrogen consumption rate, the second hydrogen consumption rate and the hydrogen leakage rate is based on the following equation:

$$t=H_{tank}/(H_i+c_1\times H_P+c_2\times H_L);$$

where t denotes the flight time, $H_{tank}$ denotes the remaining hydrogen volume, $H_i$ denotes the first hydrogen consumption rate, $H_P$ denotes the second hydrogen consumption rate, $H_L$ denotes the hydrogen leakage rate, and $c_1$ and $c_2$ denote correction constants.

4. A hydrogen fuel cell system for flight time estimation, comprising:

a hydrogen tank configured to store hydrogen;

a pressure sensor disposed in the hydrogen tank and configured to obtain an internal pressure of the hydrogen tank;

a fuel cell stack coupled to the hydrogen tank for obtaining the hydrogen to perform a power-generating reaction, wherein the fuel cell stack has an anode to perform a purge operation;

a control circuit electrically connected to the fuel cell stack and configured to obtain a reaction current value of the power-generating reaction; and a controller electrically connected to the pressure sensor and the control circuit, wherein the controller is configured to:

calculating a remaining hydrogen volume according to the internal pressure and a capacity of the hydrogen tank;

calculating a first hydrogen consumption rate according to the reaction current value, a number of a set of membrane electrodes connected in series and a Faraday constant; and calculating the flight time according to the remaining hydrogen volume, the first hydrogen consumption rate, a second hydrogen consumption rate associated with the purge operation and a hydrogen leakage rate of the fuel cell stack.

5. The hydrogen fuel cell system for flight time estimation of claim 4, wherein:

the control circuit is further configured to close a hydrogen inlet valve of the fuel cell stack; and the controller is further configured to:

record a start time when the hydrogen inlet valve is closed;

obtain a pressure value from another pressure sensor disposed on the anode, and record an end time when the pressure value is zero;

calculate a time interval according to the start time and the end time; and calculate the hydrogen leakage rate of the fuel cell stack according to the time interval and a relationship function.

6. The hydrogen fuel cell system for flight time estimation of claim 4, wherein calculating the flight time according to the remaining hydrogen volume, the first hydrogen consumption rate, the second hydrogen consumption rate and the hydrogen leakage rate by the controller is based on the following equation:

$$t=H_{tank}/(H_i+c_1\times H_P+c_2\times H_L);$$

where t denotes the flight time, $H_{tank}$ denotes the remaining hydrogen volume, $H_i$ denotes the first hydrogen consumption rate, $H_P$ denotes the second hydrogen consumption rate, $H_L$ denotes the hydrogen leakage rate, and $c_1$ and $c_2$ denote correction constants.

* * * * *